United States Patent [19]
Bennett et al.

[11] Patent Number: 5,483,406
[45] Date of Patent: Jan. 9, 1996

[54] OVERVOLTAGE PROTECTION CIRCUIT

[75] Inventors: Paul T. Bennett, Phoenix; Randall C. Gray, Tempe; John M. Pigott, Phoenix, all of Ariz.

[73] Assignee: Motorola, Inc., Schaumburg, Ill.

[21] Appl. No.: 128,425

[22] Filed: Sep. 30, 1993

[51] Int. Cl.⁶ .................................................... H02H 3/20
[52] U.S. Cl. .............................. 361/56; 361/104; 361/110
[58] Field of Search ................................ 361/56, 55, 91, 361/111, 104, 57, 110; 327/525, 392, 398–399

[56] References Cited

U.S. PATENT DOCUMENTS

| | | | |
|---|---|---|---|
| 4,573,099 | 2/1986 | Ganesan et al. | 361/56 |
| 4,879,625 | 11/1989 | Potenzone | 361/90 |
| 5,164,874 | 11/1992 | Okano et al. | 361/56 |

Primary Examiner—A. D. Pellinen
Assistant Examiner—Michael J. Sherry
Attorney, Agent, or Firm—Gary W. Hoshizaki

[57] ABSTRACT

An overvoltage protection circuit (11) for decoupling circuitry (12) from a voltage applied to an input (38). The overvoltage protection circuit (11) is integrated on an integrated circuit along with the circuitry (12). The overvoltage protection circuit (11) comprises a sense circuit (13), a timing circuit (14), a decoupling circuit (16), and a circuit (17). The sense circuit (13) detects when the voltage applied to the input (38) exceeds a threshold voltage. The timing circuit (14) is responsive to the sense circuit (13) and determines when the voltage exceeds the threshold voltage for a predetermined time. The decoupling circuit (16) is responsive to the timing circuit (14) and decouples the circuitry from the voltage applied to the input (38). The circuit (17) generates a logic signal indicating the circuitry has been decoupled.

6 Claims, 1 Drawing Sheet

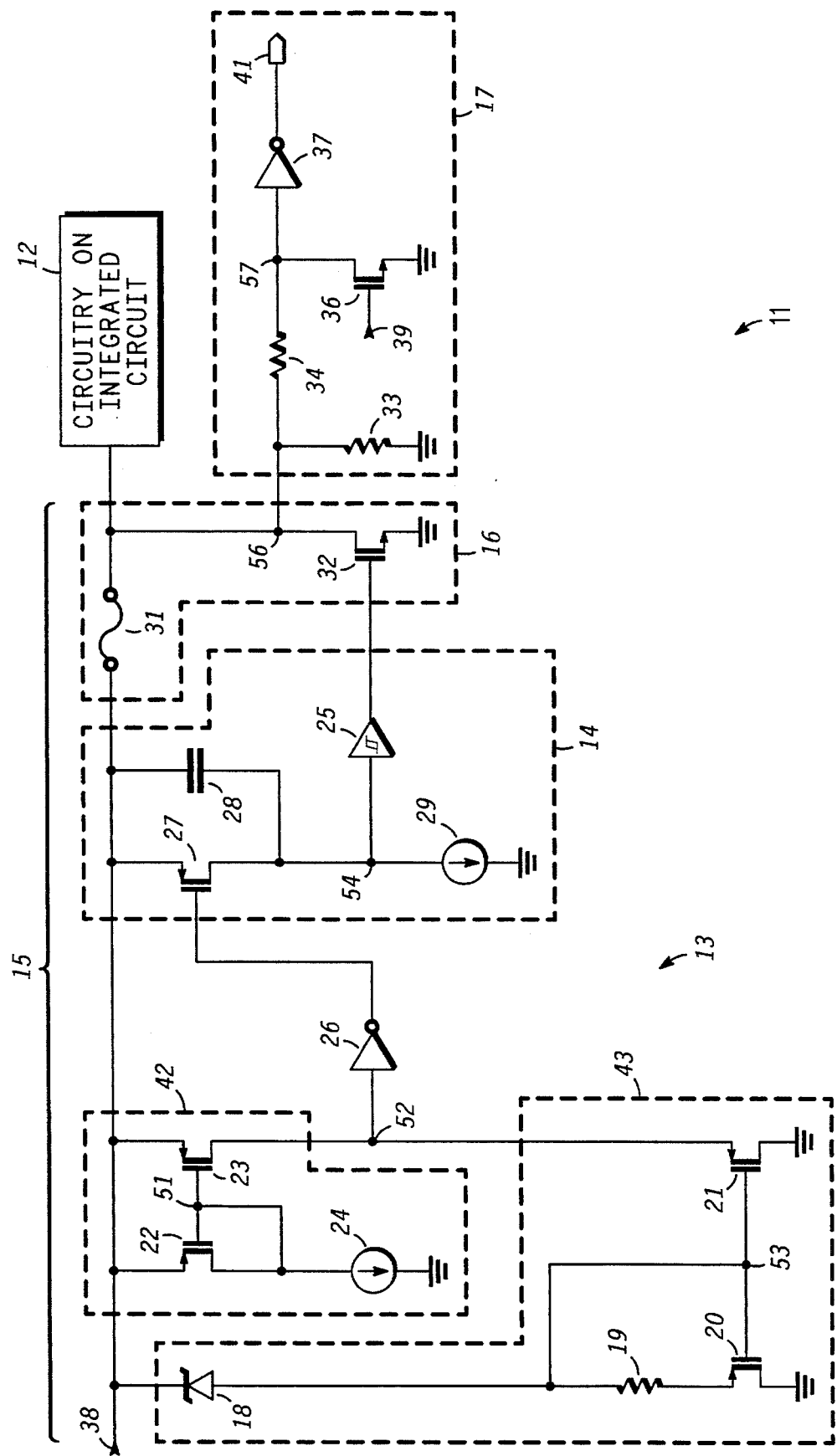

OVERVOLTAGE PROTECTION CIRCUIT

BACKGROUND OF THE INVENTION

This invention relates, in general, to protection circuits, and more particularly to overvoltage protection circuits.

It is well known that integrated circuits have specific voltage requirements which cannot be exceeded. When the requirement is exceeded, it is known as an overvoltage condition. A power supply voltage which is larger than a specified maximum voltage can terminally damage the integrated circuit. The maximum allowable voltage is a function of the semiconductor process flow and to a lesser extent the type of circuitry on the integrated circuit.

The length of time the integrated circuit is exposed to an overvoltage and the magnitude of the overvoltage are the major factors which determine the amount of damage sustained by the integrated circuit in an overvoltage condition. In some cases, the overvoltage condition could produce a hazardous condition. For example, in a circuit that controls mechanical equipment being operated by a human being, the circuit damaged by overvoltage may send out erroneous signals that radically change operating characteristics of the mechanical equipment potentially placing the human being in a dangerous situation.

A specific situation where overvoltage protection circuits are needed is in an automobile. Integrated circuit technology pervades every aspect of the automobile from seat control to engine management. The reliance on integrated circuits has greatly enhanced the overall quality and efficiency of today's automobile but also poses a minute risk. The battery voltage of an automobile exceeds the maximum voltage of many commonly used integrated circuits. Wiring harnesses and other componentry can produce shorts which could expose an integrated circuit to an overvoltage. For example, an overvoltage condition to an automotive microprocessor may cause erroneous signals to be sent to a fuel throttle motor driver circuit that could lead to a dangerous situation. These types of situations could be prevented by decoupling the circuitry from the overvoltage condition.

External componentry to protect integrated circuits from an overvoltage condition are not cost efficient nor reliable enough. Ideally, the overvoltage protection circuitry is integrated on the integrated circuit itself. A critical aspect of any overvoltage protection circuit is that it can be fully tested to insure it will function correctly should an overvoltage condition occur.

Zener diodes and external fuses are commonly used to prevent overvoltage on an integrated circuit. The zener diode is easily integrated on the integrated circuit. A zener diode prevents overvoltage on the integrated circuit by breaking down above a predetermined voltage thereby limiting the voltage on the integrated circuit to the breakdown voltage. The zener diode does not provide adequate protection if the power source creating the overvoltage condition is low impedance. The power source will cause the zener diode to dissipate too much power and eventually self-destruct leaving the circuitry unprotected.

An external fuse protects the integrated circuit by decoupling the integrated circuit from the power source providing the overvoltage when current to the integrated circuit exceeds the rated current of the external fuse. The external fuse works in theory, but in practice the external fuse has been found to provide inadequate protection. External fuses are imprecise and very slow to open up. Furthermore, external fuses sense current not voltage. An overvoltage condition can occur that damages circuitry without opening the fuse. It is critical for many systems that an overvoltage condition be detected and circuitry shut down in a very short period of time. Furthermore, the external fuse adds additional components and increases manufacturing costs.

It would be of great benefit to provide an overvoltage protection circuit that is easily integrated on an integrated circuit, rapidly disables circuitry from receiving or sending erroneous signals, and is fully testable.

SUMMARY OF THE INVENTION

Briefly stated, this invention provides an overvoltage protection circuit formed on an integrated circuit. The overvoltage protection circuit decouples circuitry on the integrated circuit from a voltage when the voltage exceeds a predetermined threshold voltage for a predetermined length of time.

A method for testing the overvoltage protection circuit is provided. A voltage is applied to the overvoltage protection circuit that exceeds a predetermined threshold voltage. When functioning correctly the overvoltage protection circuit will provide a current to decouple circuitry of the integrated circuit from an overvoltage condition. The current is limited to a value below a predetermined magnitude. The increase in current due to the overvoltage protection circuit is monitored to determine functionality.

BRIEF DESCRIPTION OF THE DRAWINGS

The single FIGURE is a schematic of an overvoltage protection circuit in accordance with the present invention

DETAILED DESCRIPTION OF THE DRAWINGS

An ideal overvoltage protection circuit for integrated circuits is testable and responds before severe damage to the circuit occurs and prevents circuits affected by the overvoltage from providing erroneous signals. Provided herein is a circuit which meets these requirements.

The single figure is a schematic diagram of an overvoltage protection circuit 11 that is easily integrated with other circuitry, responds rapidly to an overvoltage condition, and is fully testable. Overvoltage protection circuit 11 decouples circuitry 12 from a voltage applied to input 38 that causes an overvoltage condition. An overvoltage condition is defined as a voltage which can damage circuitry 12 or cause circuitry 12 to produce erroneous results. In the preferred embodiment, input 38 is a power supply terminal of an integrated circuit which couples to circuitry 12 through overvoltage protection circuit 11. Typically, overvoltage protection circuit 11 utilizes components that can withstand the overvoltage condition.

Overvoltage protection circuit 11 comprises a circuit 15 and a circuit 17. Circuit 15 detects an overvoltage condition and decouples circuitry 12 from input 38. Circuit 17 produces a logic signal indicating that circuitry 12 has been decoupled. Circuit 15 comprises a sense circuit 13, a timing circuit 14, and a decoupling circuit 16.

Sense circuit 13 is best described as a comparator for sensing a voltage applied to input 38. In the preferred embodiment, sense circuit 13 comprises a circuit 42 and a circuit 43. Circuit 42 provides a reference current. When circuit 43 is enabled it provides a current having a polarity opposite from that of the reference current. Circuit 42 includes a transistor 22, a transistor 23, and a current source 24. Transistors 22 and 23 are p-channel enhancement MOS- FETs (metal oxide semiconductor field effect transistors). Transistors 22 and 23 have a drain, gate, and source corresponding respectively to a first electrode, a control electrode, and a second electrode. Transistor 22 has the source coupled to input 38 and the gate and drain coupled to a node 51. Transistor 23 has the source coupled to input 38, the gate coupled to node 51, and the drain coupled to a node 52. Transistors 22 and 23 form a current mirror stage with transistor 23 providing the reference current. The magnitude of the reference current is a function of the current from current source 24, the conductive area ratios of transistors 22 and 23 and the drain to source voltage across transistor 23.

Circuit 43 includes a zener diode 18, a resistor 19, a transistor 20, and a transistor 21. Transistors 20 and 21 are n-channel enhancement MOSFETs. Transistors 20 and 21 have a drain, a gate, and a source corresponding respectively to a first electrode, a control electrode, and a second electrode. Zener diode 18 is coupled between input 38 and a node 53. Resistor 19 has a first terminal coupled to node 53 and a second terminal. Transistor 20 has the drain coupled to the second terminal of resistor 19, the gate coupled to node 53, and the source coupled to ground. Transistor 21 has the drain coupled to node 52, the gate coupled to node 53, and the source coupled to ground. An inverter 26 has an input coupled to node 52 and an output.

In the preferred embodiment, zener diode 18 has a breakdown voltage which exceeds the normal operating voltage being applied to input 38. Thus under normal operating conditions no current flows through zener diode 18 which turns off transistors 20 and 21. Circuit 42 produces a one or high logic level at node 52. The output of inverter 26 receives this signal and provides a zero or low logic level at its output. Inverter 26 acts as a buffer for circuits 42 and 43.

Current flows through zener diode 18 when the voltage applied to input 38 exceeds its breakdown voltage. Transistor 20 receives the current from zener diode 18 which is mirrored by transistor 21. Resistor 19 limits the current through zener diode 18 and transistor 20. The overvoltage condition is detected when the current of transistor 21 exceeds the reference current of transistor 23 thereby generating a zero logic level at node 52. A threshold voltage for input 38 is set by the choice of breakdown voltage for zener diode 18, the value of resistor 19, the geometries of transistors 20 and 21, and the reference current of circuit 42. The threshold voltage is the voltage applied to input 38 at which the current of transistor 21 equals the reference current of transistor 23. As the voltage at input 38 exceeds the threshold voltage the output of inverter 26 changes from a zero logic state to a one logic state. Although in this embodiment currents are compared to one another for detecting the overvoltage condition, a voltage comparison would work equally as well. A comparator receiving a voltage corresponding to the voltage applied to input 38 and a reference voltage to which it is compared would also produce equivalent results.

Timing circuit 14 generates a signal indicating the voltage applied to input 38 has exceeded the threshold voltage for a predetermined time. Timing circuit 14 comprises a transistor 27, a capacitor 28, a current source 29, and a Schmitt trigger 25. Transistor 27 is a p-channel enhancement transistor having a drain, a gate, and a source corresponding respectively to a first electrode, a control electrode, and a second electrode. Transistor 27 has the gate coupled to the output of inverter 26, the source coupled to the input 38, and the drain coupled to a node 54. The capacitor is coupled between input 38 and node 54. Current source 29 has a terminal coupled to node 54. Schmitt trigger 25 has an input coupled to node 54 and an output.

Under normal operating conditions a zero logic state is applied to the gate of transistor 27. In the preferred embodiment, enabled transistor 27 provides a current greater than the current of current source 29. This generates a one logic level at node 54. Schmitt trigger 25 receives the one logic level and outputs a zero logic state.

A one logic level applied to the gate of transistor 27 indicates an overvoltage condition has occurred. The one logic level disables transistor 27. Current source 29 discharges capacitor 28. The discharge time of capacitor 28 is determined by the current magnitude of current source 29 and the size of capacitor 28. When a zero logic level is received at the input of Schmitt trigger 25 its output transitions to a one logic level. The one logic level will not be generated if transistor 27 is enabled before capacitor 28 discharges to the zero logic level.

Damage to circuit 12 is prevented by decoupling circuit 16 which decouples circuitry 12 from input 38 in the event of the overvoltage condition. Decoupling circuit 16 comprises a fuse 31 and a transistor 32. Fuse 31 has a terminal coupled between input 38 and a node 56. Circuitry 12 includes a terminal coupled to node 56. In the preferred embodiment, fuse 31 is formed from aluminum or an aluminum alloy. Aluminum or aluminum alloy fuses have been used on integrated circuits with good results. Fuses formed from such materials have repeatable and predictable characteristics. Fuse 31 is low resistance and will open when passing a current which exceeds a predetermined magnitude.

Transistor 32 is an n-channel enhancement MOSFET transistor. Transistor 32 has a drain, a gate, and a source corresponding respectively to a first electrode, a control electrode, and a second electrode. Transistor 32 provides a current having a magnitude which exceeds the predetermined magnitude of the fuse to insure circuitry 12 is decoupled from input 38. Transistor 32 has a gate coupled to the output of Schmitt trigger 25, a drain coupled to the second terminal of fuse 31, and a source coupled to ground. When enabled, transistor 32 forces enough current through fuse 31 to cause fuse 31 to open. It should be noted that transistor 32 could be a bipolar transistor or other type of power device as long as it provides enough current to open fuse 31.

If circuitry 12 is decoupled from input 38, circuit 17 generates a logic signal indicating the event has occurred. Circuit 17 comprises a resistor 33, a resistor 34, a transistor 36, and an inverter 37. Resistor 33 is coupled between node 56 and ground. Resistor 34 is coupled between node 56 and a node 57. Transistor 36 is a n-channel enhancement MOSFET having a drain, a gate, and a source corresponding respectively to a first electrode, a control electrode, and a second electrode. Transistor 36 has the drain coupled to node 57, the gate coupled to an input 39, and the source coupled to ground. Inverter 37 has an input coupled to node 57 and an output coupled to an output 41. Resistor 33 provides a path to ground to discharge node 56 when fuse 31 opens. Leakage currents due to transistor 32 would also discharge node 56. Resistor 34 and transistor 36 are for test purposes. A signal applied to input 39 allows a zero logic level to be generated at node 57 even if a voltage is applied to input 38. Inverter 37 receives the zero logic level at node 57 and generates a one logic level at output 41 indicating circuitry 12 has been decoupled.

Normal operation (the threshold voltage has not been exceeded) of overvoltage protection circuit 11 includes fuse 31 coupling the voltage applied to input 38 to circuitry 12. Sense circuit 13 outputs a zero logic level (inverter 26) that is received by timing circuit 14. Timing circuit 14 outputs a zero logic level (Schmitt trigger 25) that is received by decoupling circuit 16. Transistor 32 of decoupling circuit 16 is disabled by the zero logic level. Circuit 17 provides a zero logic level at output 41.

An overvoltage condition (the threshold voltage has been exceeded) has sense circuit 13 generating a one logic level (inverter 26). Timing circuit 14 generates a one logic level (Schmitt trigger 25) after the one logic level received from sense circuit 13 has exceeded the predetermined time. Decoupling circuit 16 receives the one logic level from timing circuit 14 enabling transistor 32. Current from transistor 32 opens fuse 31 decoupling circuitry 12 from input 38. Node 56 discharges through resistor 33 causing inverter 37 to output a one logic level. The one logic level indicates circuitry 12 has been decoupled and that the overvoltage condition has occurred. Circuitry external to the integrated circuit on which overvoltage protection circuit 11 and circuitry 12 are formed could also be protected by coupling node 56 to a pad of the integrated circuit. The external circuitry is coupled to node 56 and powered through fuse 31.

It is highly desireable to test overvoltage protection circuitry 11 on the integrated circuit with all other circuitry. Overvoltage protection circuit 11 can be tested by limiting current at input 38 to a level which does not open fuse 31 but of a magnitude significant enough to insure transistor 32 is enabled and supplying current to fuse 31. The threshold voltage is measured by incrementally increasing the voltage at input 38 until current to input 38 increases to signify transistor 32 has been enabled. An alternate test includes providing a voltage slightly less than the threshold voltage to input 38 and a voltage slightly more than the threshold voltage to input 38. In the former case no significant current increase would be measured. In the latter case a significant current increase would be measured indicating the threshold voltage is between the two applied voltages.

The time needed generate the one logic level from circuit 14 is measured by providing a voltage pulse to input 38 which exceeds the threshold voltage. The voltage pulse width is varied until transistor 32 is enabled. An alternate test is to provide a first pulse having a period less than the predetermined time and a second pulse having a period more than the predetermined time. The first pulse should not increase current measured at input 38 significantly. The second pulse should provide a significant increase in current at input 38.

The fuse may be tested to insure it does not open below some minimum current. The testing occurs by by enabling transistor 32 and current limiting input 38. Opening test fuses on each wafer would also provide data on the minimum current needed to open the fuse.

Circuit 17 may be tested by applying a voltage less than the threshold voltage to input 38 and monitoring a zero logic level at output 41. For test purposes a one logic level at output 41 is generated by applying a one logic level to input 39.

By now it should be appreciated that a testable overvoltage protection circuit has been provided. The circuit is easily integrated on an integrated circuit, does not take up significant space of a semiconductor die, is testable, and responds rapidly to the overvoltage condition.

We claim:

1. An integrated circuit including a testable protection circuit for preventing an overvoltage condition from damaging circuitry contained therein, said protection circuit comprising:

a sense circuit responsive to a voltage, said sense circuit providing a signal indicating said voltage exceeds a predetermined threshold voltage;

a timing circuit responsive to said signal of said sense circuit, said timing circuit providing a signal indicating the overvoltage condition wherein said voltage exceeds said predetermined threshold voltage for a predetermined time;

a fuse coupled having a first terminal coupled for receiving said voltage and a second terminal coupled to the circuitry of the integrated circuit; and a transistor having a first electrode coupled to said second terminal of said fuse, a control electrode coupled for receiving said signal from said timing circuit, and a second electrode coupled to a terminal of a power supply wherein said transistor is enabled by said signal from said timing circuit during the overvoltage condition and wherein said transistor opens said fuse decoupling the circuit of the integrated circuit from said voltage.

2. An integrated circuit including a protection circuit as recited in claim 1 wherein said sense circuit includes an input for receiving said voltage and an output for providing said signal, said sense circuit comprising:

a zener diode having a first terminal coupled to said input and a second terminal;

a resistor having a first terminal coupled to said second terminal of said zener diode and a second terminal;

a first transistor of a first conductivity type having a first electrode coupled to said second terminal of said resistor, a control electrode coupled to said first terminal of said resistor, and a second electrode coupled to a terminal of a power supply;

a second transistor of a second conductivity type having a first electrode and a control electrode coupled together and a second electrode coupled to said input;

a current source having a terminal coupled to said first electrode of said second transistor;

a third transistor of said second conductivity type having a first electrode, a control electrode coupled to said control electrode of said second transistor, and a second electrode coupled to said input; and a fourth transistor of said first conductivity type having a first electrode coupled to said first electrode of said third transistor, a control electrode coupled to said control electrode of said first transistor, and a second electrode coupled to said terminal of said power supply.

3. An integrated circuit including a protection circuit as recited in claim 2 wherein a current of said fourth transistor is greater than a current of said third transistor when said voltage exceeds said predetermined threshold voltage.

4. An integrated circuit including a protection circuit as recited in claim 1 wherein said timing circuit includes an input to receive said signal of said sense circuit, a terminal to receive said voltage, and an output, said timing circuit comprising:

a transistor having a first electrode, a control electrode coupled to said input, and a second electrode coupled to said terminal of said timing circuit;

a capacitor having a first terminal coupled to said terminal of said timing circuit and a second terminal coupled to said first electrode of said transistor;

a current source having a terminal coupled to said first electrode of said transistor; and a Schmitt trigger having an input coupled to said first electrode of said transistor and an output coupled to said output of said timing circuit.

5. An integrated circuit including a protection circuit as recited in claim 1 further including a logic circuit coupled to said second terminal of said fuse for providing a signal indicating the circuitry of the integrated circuit is decoupled from said voltage.

6. An integrated circuit including a protection circuit as recited in claim 5 wherein said logic circuit comprises:

a first resistor having a first terminal coupled to said second terminal of said fuse and a second terminal coupled to said terminal of said power supply;

a second resistor having a first terminal coupled to said second terminal of said fuse and a second terminal;

a transistor having a first electrode coupled to said second terminal of said second resistor, a control electrode for receiving a test signal, and a second electrode coupled to said terminal of said power supply; and an inverter having an input coupled to said second terminal of said second resistor and an output.

* * * * *